Patented June 21, 1938

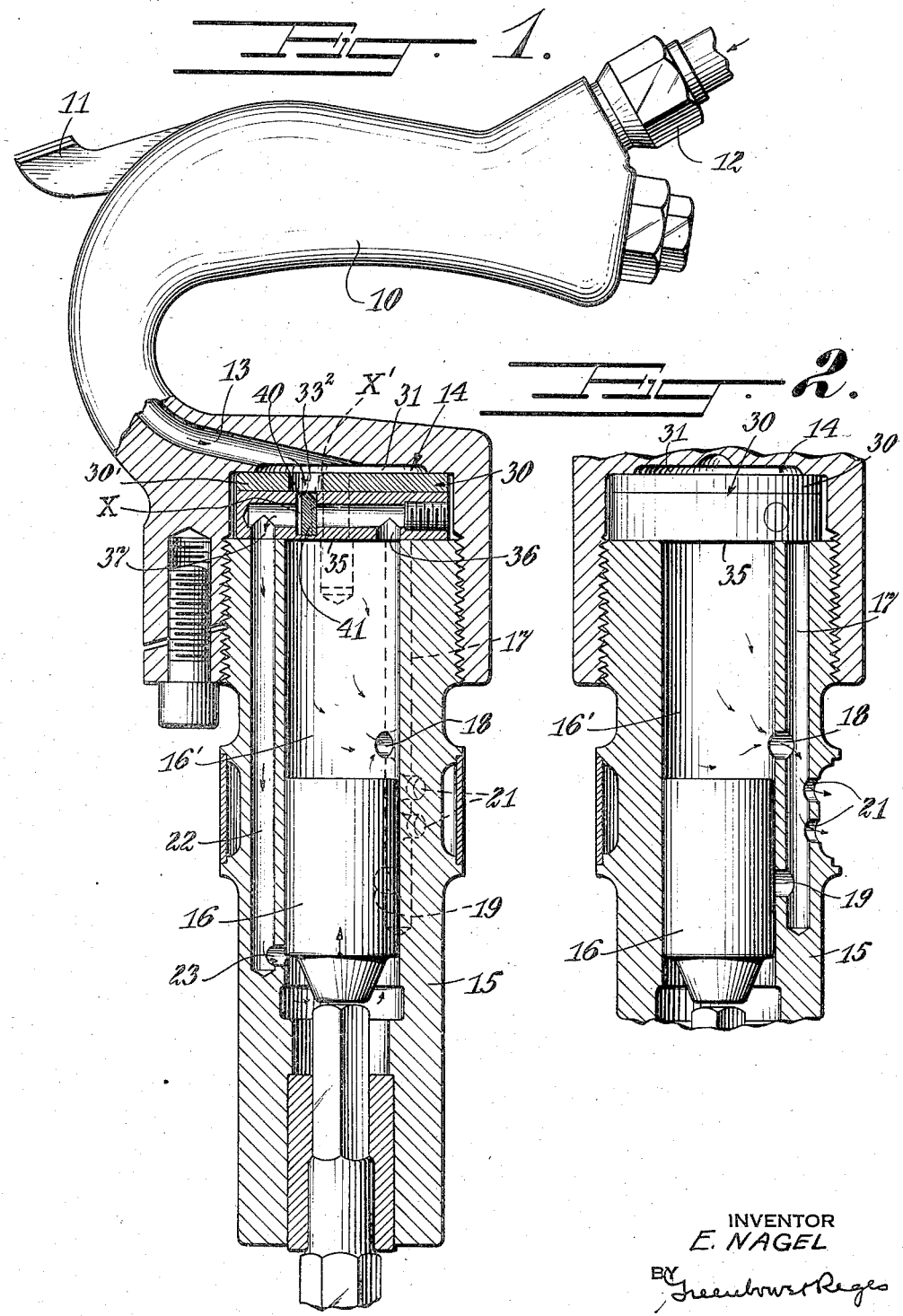

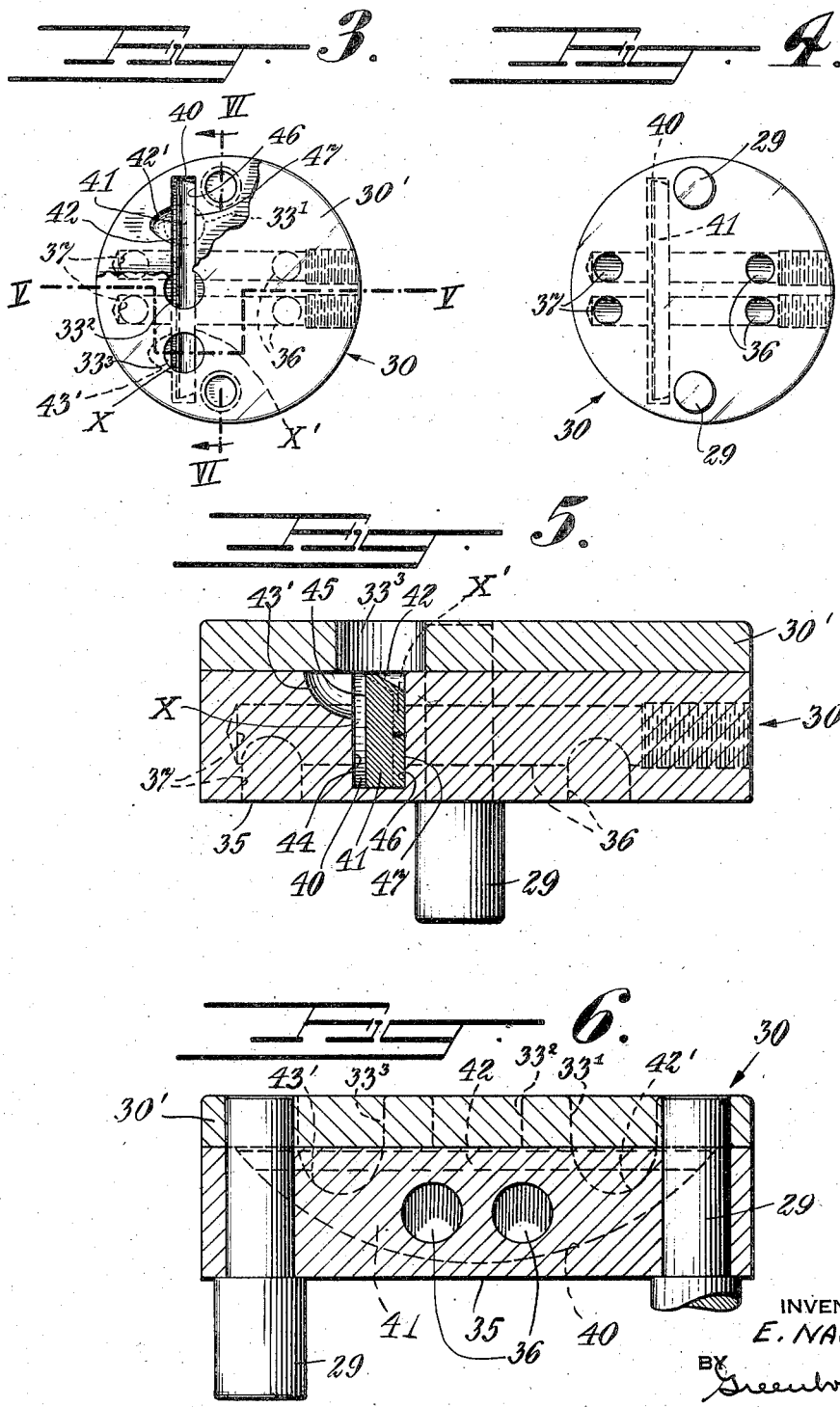

2,121,364

UNITED STATES PATENT OFFICE 2,121,364

OPERATING VALVE FOR PNEUMATIC HAMMERS

Edward E. Nagel, Lakewood, Ohio, assignor to Master Tool Company, a corporation of Ohio Application July 6, 1936, Serial No. 89,068

5 Claims. (Cl. 121—19)

This invention relates to pneumatic tools in which a reciprocal piston is employed as an impact member and relates more particularly to what are commonly termed pneumatic hammers.

Pneumatic hammers are well known and an important part of the operating mechanism is the valve which controls the pressure fluid inlets to furnish the driving force for operating the piston, and it is an object of the present invention to provide a simple and effective operating valve for devices of the above character.

Another object of the invention is to provide a quick acting valve which will operate with a minimum amount of fluid.

Another object of the invention is to provide a valve of the sliding type in which an opening and closing of the valve is caused by action of the piston.

Another object of the invention is to provide a valve operable to control a plurality of pressure fluid inlets.

In tools of the character to which the present invention relates, as for example, a hammer or chipper, air enters the air inlet in the handle and a throttle valve actuated by a trigger is provided for controlling the amount of air supplied.

After the air passes the throttle valve it is conducted through a passage in the handle to a valve chamber in which is disposed an operating valve and valve box. Operating valves of various constructions have been made and a common type is to have a valve which is moved back and forth by the action of air pressure on its differential areas. As the valve moves in one direction it admits air back of a piston throwing it against a chisel or rivet set.

The piston after striking a blow is returned for another stroke by air admitted to the front of the piston. The present invention provides an improved form of operating valve which includes a valve slot in which a member, preferably in the form of a plate, is mounted in a guideway or slot for movement sidewise to control two inlets for fluid under pressure or what are termed the pressure fluid inlets. The plate member which operates in the manner of a shuttle and which will be termed the valve is so arranged that one side is engageable with a seat around an inlet orifice or orifices when the valve is moved in one direction and the other side is engageable with another seat around another inlet orifice or orifices when the valve is moved in an opposite direction.

The arrangement of the air conduits and the path of movement of the valve are such that when one side of the valve opens pressure fluid exerts a force to move a piston in one direction.

The dead or discharged air compressed by the piston operates to exert a force in an opposite direction along one side of the valve whereby the valve is moved to close the open side of the valve and open the closed side to let pressure fluid exert a force to move the piston in the opposite direction and vice versa, thus reciprocating the piston to produce successive impacts for the purpose intended.

Ths invention will be more clearly understood by reference to the following description together with the accompanying drawings, in which Fig. 1 is a side elevational view partly in section of a conventional pneumatic hammer showing the present operating valve applied thereto.

Fig. 2 is a fragmentary view in cross section showing an outside view of the valve box and the relative position of an exhaust passage and ports.

Fig. 3 is a top view of a valve constructed in accordance with the present invention.

Fig. 4 is a bottom view of the valve.

Fig. 5 is an enlarged view taken on line V—V in Fig. 3, and

Fig. 6 is an enlarged view taken on line VI—VI in Fig. 3.

The present invention may be applied to any well known type of pneumatic hammer and the form for the purpose of illustrating a practical embodiment of the invention may comprise a handle 10 having a throttle with a bushing 12 for connection to a pressure line (not shown). The throttle may be provided with a throttle lever or trigger 11 for controlling the passage of air through a conduit 13 leading to an operating valve chamber 14. Engaging the member forming the chamber 14 is a barrel 15 having a piston 16 movable in a piston chamber 16'.

The operating valve chamber is positioned at the normal upper end of the piston chamber and the other end of the piston chamber is closed by the chisel or rivet set in the usual manner.

Leading from one side of the operating valve chamber is a conduit 17 formed in the wall of the barrel having ports 18 and 19 affording communication between conduit 17 and the piston chamber. These ports are so arranged as to be opened and closed during a movement of the piston 16. Leading from the conduit 17 is an exhaust port 21. Another conduit 22 formed in the wall of the barrel leads from the other side of the operating chamber and is provided with a port 23 affording communication between the said conduit and the lower end of the piston chamber.

The foregoing description sets forth the ordinary type of pneumatic hammer and the present invention as above pointed out provides an improved form of operating valve therefor.

The present operating valve is a self-contained unit and may be made to fit the valve chamber of any standard hammer or may find use in other types of pneumatic tools.

As shown more in detail in Figs. 3 to 6 the valve consists of a valve box or casing 30 disc-like body and a cover plate 30' having apertures 33', 33², and 33³ leading from conduit 13 to valve 41. The shape of the valve box may be varied to meet different conditions. Dowel pins 29 are provided to locate and hold the casing in position when in the valve chamber.

It will be understood that the distance of travel of the valve as it reciprocates controls the power and speed of the piston, and that in order to meet different conditions, the distance of travel of the piston may be varied.

Inlets 33', 32², and 33³ are provided in the form of circular apertures and as shown in Fig. 1 the pressure fluid feed conduit 13 leads to a recess 31 for the passage of fluid through the inlets. The bottom surface 35 of the valve box is finished flat to provide a seal and has what may be termed intermediate inlets or valve outlets 36 and 37.

The intermediate inlet 36 which leads directly into the piston chamber 16' on the upper side of the piston, communicates with one side of a valve slot 40 and the intermediate inlet 37 which leads into conduits 22 communicate with the other side of the said valve slot and the inlets 33 afford communication between the valve slot and conduit 13.

The valve slot is provided with a valve 41 in the form of a plate of less thickness than the width of the slot or chamber 40 so that a back and forth or shuttle movement of the valve opens or closes the intermediate passages 36 and 37. The upper edge 42 of the valve 41 is beveled to facilitate the operation of the valve in conjunction with the piston.

The valve seat 44 and the face 45 at one side of the plate 41 constitute a valve which may be termed the left valve and indicated in the drawings by the reference character X. This valve controls the flow of pressure fluid through conduit 22 for delivery to the lower side of the piston 16.

The valve seat 46 and face 47 at the other side of plate 41 may constitute a right valve controlling the flow of pressure fluid in conduit 17. This valve is indicated by the reference character X'.

In operation assuming the piston is in the lower position as shown in Fig. 1, fluid under pressure admitted by an actuation of the trigger 11 passes through inlets 33', 32², and 33³ through left valve X, conduit 22, ports 23 and into the lower part of the piston chamber 16' causing the piston 16 to lift. As the piston rises it causes some of the fluid to discharge through port 18.

A continued movement of the piston closes port 18 and the gas above the piston is compressed and forced into inlet 36 exerting a force against the relatively large surface 47 of the valve member 41.

At this time the piston has moved to open port 19 relieving the pressure on the opposite side of the valve member causing valve X to close and valve X' to open.

When the piston passes port 19 and the active fluid goes to exhaust, it is obvious that the external force for driving the piston is removed, however, the potential energy or momentum carries the piston toward the inlet 36 to the extent that the air in the upper portion of the piston chamber is compressed sufficiently to exert the necessary force to move the valve member. The first slight movement of this member admits pressure fluid from conduit 13 and the force applied serves to completely open the valve. The piston is of course ready to descend.

By reason of the bevel edge 42 of the plate 41, the edge is subject to live pressure fluid and since the area of this beveled edge 42 is less than the flat side of the plate 41, which in the position shown in the several figures is subject to the pressure fluid tending to hold the plate against the right hand wall of the slot 40, there is exerted a counter-force of lesser magnitude in opposition to that normally impressed against the side of the plate. Consequently upon an increase of pressure in the passage or inlet 36, by upward movement of the piston 16, the plate 41 is moved with great rapidity to open the inlet 36 and close the inlet 37 which facilitates operation of the hammer.

The valve plate may vary in thickness depending upon the degree of power desired. For example, for the ordinary power hammer the valve may be $\frac{3}{16}$ of an inch thick and this thickness may be reduced to say $\frac{1}{8}$ of an inch when a faster operating hammer is desired. Notches 42' and 43' in line with inlets 33' and 33³ respectively, in cover plate 30' provide pressure surfaces on the valve to effect a movement thereof to open the valve for the passage of fluid into conduit 22.

The pressure fluid which is delivered continuously from conduit 13 flows through valve X', through the valve orifice 36 and directly into the piston chamber above the piston. This causes the piston to descend compressing the fluid in the lower portion of the chamber. At this time the piston has closed port 19 but opened port 18 relieving the pressure on the valve X' so that the fluid compressed by the downward movement of the piston exerts a force against the left face of the valve member and valve X is opened and valve X' closed and the pressure fluid flows through valves X to lift the piston with the result that valve X is closed and valve X' opened, which operations are repeated as long as pressure fluid is fed to the device.

In the present form of valve as constructed in accordance with the present invention the distance of travel of the valve member is relatively short so that no loss of air occurs. By reason of the novel construction provided, the entire flow area is opened instantaneously and there is no restriction or retardation of the air flow as in certain other valves.

Since the action of the valve member is instantaneous it has been found that fluid losses are appreciably reduced and the device has the advantage of economic operation.

The simplicity of parts and the absence of wearing elements make the present operating valve a practical and effective unit.

Although a preferred embodiment of the invention is shown and described herein, it is to be understood that modifications may be made therein without departing from the spirit and scope of the invention as set forth in the appended claims.

What is claimed is:

1. A pneumatic tool comprising a cylinder, a piston movable in said cylinder, a tool positioned for impact by said piston, means for supplying a fluid under pressure to said cylinder including valve inlet ports, and a valve element having outlet ports for the passage of said pressure fluid from said valve to said cylinder, said valve element having a slot between said outlet ports in alignment with said valve inlet ports and provided with flat parallel side walls forming valve seats, said slot being of a lesser width than the diameter of said valve inlet ports, a flat member provided with parallel sides movable in said slot, between said valve outlet ports with the entire area of its side alternately engageable with the valve seat to open and close said ports, means for conducting said pressure fluid from said outlet ports for entrance to said cylinder on opposite sides of said piston, means for conducting exhaust fluid to actuate said member to close one valve outlet port and open the other, and said flat member having a beveled edge extending throughout its length and subject to pressure fluid in one position thereof for exerting a pressure of lesser magnitude in opposition to that normally impressed upon said flat member to cause rapid movement of the latter upon an increase of pressure of said exhaust fluid.

2. A pneumatic hammer comprising a barrel having a piston chamber, a piston in said chamber, a valve chamber, a valve box in said chamber provided with a slot having parallel side walls forming valve seats, inlet ports in said valve box extending across said slot and communicating with said valve chamber for supplying pressure fluid to said valve slot, outlet ports extending from each side wall of said slot and communicating with opposite sides of said piston for the passage of pressure fluid thereto to cause reciprocatory movement of said piston, a flat valve member of less thickness than the width of said slot and provided with parallel sides engageable throughout the area thereof with said valve seats for controlling said outlet ports, said valve member having a beveled edge extending the entire length thereof adjacent one of said outlet ports and in alignment with said inlet ports and subject to pressure fluid for exerting a force of lesser magnitude in opposition to that exerted against said valve member when closing one of said outlets leading to one side of said piston to cause rapid movement of the flat valve member upon an increase of pressure by movement of said piston, and said valve member operating upon a return movement of said piston to actuate said valve member to cause an opposite movement of said piston.

3. A pneumatic hammer comprising a barrel having a piston chamber, a piston in said chamber, a valve chamber, a conduit for live pressure fluid leading to said valve chamber, a valve box in said chamber provided with a slot having plane parallel side walls forming valve seats, passages in said box on opposite sides of said slot and communicating therewith, a flat valve member of less thickness than the width of said slot provided with parallel sides and movable in said slot with the entire area of its side alternately engageable with said valve seats to open and close said passages, inlet passages in said box above one edge of said valve of a diameter greater than the width of said slot and communicating with said conduit, said edge being beveled along one side for the entire length of said valve member and subject to live pressure fluid in one position of said valve member for exerting a pressure of lesser magnitude in opposition to that exerted against one side of said flat valve member to cause rapid movement of said valve member upon an increase of pressure fluid in one of the passages leading to said slot, and notches in said valve chamber on the side of said flat valve member opposite to said bevel and coinciding with the inlet passages in said box.

4. An operating valve for a pneumatic hammer comprising a valve box having an inlet for live pressure fluid, said box having a slot disposed in alignment with said live pressure fluid inlet of a lesser width than the diameter of said inlet and provided with parallel side walls forming valve seats, a pair of spaced air passages communicating with said slot, and a flat segmental valve member in said slot subject to live pressure fluid and movable from side to side in said slot with the entire area thereof engageable with said valve seats for opening and closing said passages, said valve having a longitudinal portion thereof subject to live pressure fluid in one position of said valve tending to exert an opposing force of lesser magnitude to cause rapid movement of said valve upon an increase of pressure fluid in one of said passages.

5. An operating valve for a pneumatic hammer comprising a valve box having an inlet for live pressure fluid, said box having a slot disposed beneath said live pressure fluid inlet of lesser width than the diameter of said inlet and provided with plane parallel side walls forming valve seats, a pair of spaced air passages communicating with the plane parallel side walls of said slot, and a plate valve member in said slot subject to live pressure fluid and movable in said slot with the entire area of its side walls engageable with the side walls of said slot to alternately open and close said passages, said valve member having a beveled edge throughout the length thereof and subject to live pressure fluid in one position of said valve tending to exert an opposing force to that exerted against the side wall of said valve to cause rapid movement of the latter upon an increase of pressure fluid in one of said passages.

EDWARD E. NAGEL.